United States Patent [19]
Martsfeld et al.

[11] Patent Number: 5,648,614
[45] Date of Patent: Jul. 15, 1997

[54] INTEGRATED CIRCUIT AND SEAL

[75] Inventors: Rainer Martsfeld, Ludwigshafen; Rolf Vogt, Oftersheim; Thomas Kuhlmann, Heidelberg; Hanno Wentzler, Weinheim, all of Germany

[73] Assignee: Firma Carl Freudenberg, Weinheim, Germany

[21] Appl. No.: 583,793

[22] Filed: Aug. 17, 1995

Related U.S. Application Data

[63] Continuation of Ser. No. 264,535, Jun. 23, 1994, abandoned.

[30] Foreign Application Priority Data

Jun. 24, 1993 [DE] Germany .................. 43 20 939.4

[51] Int. Cl.⁶ ............................................ G01L 7/00
[52] U.S. Cl. ................................... 73/706; 73/726
[58] Field of Search ............................ 73/706, 724, 727, 73/592, 768, 726; 277/2, 901; 384/448, 484; 324/166, 173

[56] References Cited

U.S. PATENT DOCUMENTS

| | | | |
|---|---|---|---|
| 3,500,091 | 3/1970 | Jones | 324/174 |
| 5,090,871 | 2/1992 | Story et al. | 277/2 |
| 5,097,701 | 3/1992 | Nantua et al. | 73/118.1 |
| 5,121,929 | 6/1992 | Cobb | 277/2 |
| 5,184,069 | 2/1993 | Adler | 324/174 |
| 5,264,790 | 11/1993 | Moretti et al. | 384/448 |
| 5,330,720 | 7/1994 | Sorbo et al. | 277/2 |
| 5,388,916 | 2/1995 | Ohtsuki et al. | 384/448 |
| 5,393,146 | 2/1995 | Ishikawa et al. | 384/448 |

FOREIGN PATENT DOCUMENTS

| | | |
|---|---|---|
| 0 378 939 | 7/1990 | European Pat. Off. . |
| 40 38 394 | 6/1992 | Germany . |

Primary Examiner—Richard Chilcot
Assistant Examiner—Jewel Artis
Attorney, Agent, or Firm—Kenyon & Kenyon

[57] ABSTRACT

A seal comprising two rings is disclosed. A sensor or signal generator is immovably affixed to the polymeric member of one of the rings. In one embodiment, the other of the rings includes a corresponding sensor or signal generator, depending on which of these types of elements is affixed to the first ring, that is immovably affixed to the second ring.

24 Claims, 2 Drawing Sheets

INTEGRATED CIRCUIT AND SEAL

This application is a continuation of application Ser. No. 08/264,535, filed June 23, 1994, now abandoned.

BACKGROUND OF THE INVENTION

The invention relates to a seal having a polymeric member to which is immovably affixed a flexible auxiliary element, the auxiliary element being suited to perform at least one electrical function.

This type of seal is disclosed by the German Published Patent Application 40 38 394. It is intended to sealingly guide at least one conductor through the wall of a housing, which encloses a liquid and a secondary aggregate having a sensor mounted thereon. The sensor is connected to the flexible end of the conductor and is suited for detecting specific measurable values. The position of the sensor that results during normal operational use is substantially determined by the position of the aggregate, and particular accuracy is required to install the sensor when a reliable measuring accuracy is desired. This results in high assembly costs.

There remains a need for a seal that can be simply assembled and which will easily allow the precise measurement of various parameters.

SUMMARY OF THE INVENTION

The invention provides a two-part seal comprising an inner and an outer sealing member, typically provided in the form of a ring. Attached to these sealing members are flexible auxiliary elements that serve as electrical signal type pulse generators and/or sensors. The combination of signal generator and sensor integrally connected to the structure of the seal itself enables the generation and detection of signals relating to rotational frequency, temperature, moisture or pressure. Once detected, these signals can be routed to a signal processing location for further use.

The auxiliary element can be embedded in the polymeric member or be bonded to its surface. (The material member will typically be provided as the inner or outer ring of a mechanical seal.) The flexibility of the invention is such that the particular point at which the auxiliary element is mounted onto the material member can be selected solely to optimally acquire suitable signals, and not as the result of arbitrary geometric constraints. In fact, the present invention permits the auxiliary element, be it a sensor or a signal generator, to be positioned at any desired location with a high degree of accuracy.

The seal is manufactured using known injection-molding and compression-molding dies or casting tools. Such tools can conventionally be produced with a high degree of precision, for example, with tolerances in the micrometer range. The auxiliary element can then expediently be joined to the material member as follows: The flexible auxiliary element is first inserted into the tool and then forced against the inner wall of the tool (the mold cavity) by molding material subsequently injected into the tool in a liquid or dough-like state, which serves to join the auxiliary element to the outer surface of the injected material. The auxiliary element conforms to the geometry of the inner wall of the tool and is permanently joined at a precisely definable point to the material member of the seal as it undergoes hardening. The auxiliary element so placed can contain an electrical pulse generator, a sensor, or any other suitable electrical device.

The auxiliary element can be connected by means of a flexible conductor to a plug-in device or to a measuring device, which is at least partially embedded in the material member. This makes it possible for the pulse generator and/or sensor to be readily integrated into the sealing device. Flexible printed-circuit boards allow many elements to be accommodated in a very small space. By using a flexible printed circuit board, the circuit board mounted elements can be adapted to fit the geometric shape of the seal without requiring the use of additional elements. A sensor or pulse generator can also be arranged on a flexible printed circuit board and be in direct electroconductive contact with a plug-in connection, which serves as an interface for additional measuring and processing devices, thereby obviating the need for any additional lines. Hence, by relying on a design that is simple to assemble, the potential for measurement and detection errors is minimized.

The pulse generator or sensor can also be constructed of a flexible printed-circuit board of the type that closes upon itself in a ring shape. Coding elements circumferentially distributed along the ring can be used to generate pulses. These codes are applied to the carrier material of the flexible printed-circuit board in the transverse or longitudinal direction, and extend with a clearance "A" from one another. Thus, a pulse generator can be realized with simple means, and be made available without complicated structures and assembly-intensive manufacturing steps. The coding elements used for pulse generation can optionally be provided in magnetized form. However the coding elements are provided, by integrating the generation and detection of pulses and providing signal routing within the seal, one obtains a greatly miniaturized device. The entire system can be manufactured inexpensively and is customer-friendly. Moreover, in addition to providing signals representative of the rotational frequency of a part, signals representative of other parameters, such as temperature, moisture or pressure can also be generated and detected with this system for further processing with a high degree of accuracy.

The flexible printed-circuit boards used for the pulse generator and the conductive connection between the sensor and the plug-in connection can have a rectangular shape. With this type of construction, there is no need to take any additionally steps to adapt the shape sensor or pulse generator to the shape of the material member or the machine part. Not only is this a simple construction to manufacture, but it can also be extrusion-coated with the material of the material member, in which case conformance of the shape of the sensor/pulse generator to the material member is virtually automatic.

If need be, several pulse generators and/or sensors can also be installed on or in the material member, in order to facilitate detection of several different signals relevant for various applications.

As noted, the auxiliary element can be designed to be closed upon itself in a ring shape. Consequently, in this embodiment the auxiliary element surrounds the material member in the circumferential direction. As with the previous embodiment, this embodiment can be used to measure numerous variables, such as rotational frequency or pressure. One possible design for the detection of such a parameter is to have the auxiliary element be a piezoelectric element.

Affixing the sensor to the material member of a seal permits the detection of leakage or the temperature of the sealing edge. The sensor preferably is designed as a Hall-effect sensor. Another possible sensor design is an electric circuit arrangement containing resistance and capacitance, the flexible printed-circuit board on which the sensor is situated, also serving to supply voltage and route the signals.

To detect temperature, the auxiliary element can be designed as a thermoelement in connection with a bridge circuit. By using flexible printed-circuit boards, these elements can be accommodated without having to use additional auxiliary devices.

Another embodiment constitutes forming the seal as functional unit (e.g. a cassette), the first auxiliary element being combineable with the second auxiliary element that is connected to the relatively movable machine part. Both auxiliary elements can be disposed to mutually oppose one another, for example in the area of directly mutually opposing sides. This has the advantage that the two auxiliary elements can be pre-assigned to one another with considerable precision.

The invention can be used to provide a seal into which a pulse generator and/or sensor is integrated. The use of flexible printed-circuit boards facilitates miniaturization, so that measuring instruments can be directly adhered or prevulcanized onto the over-all sealing device. In this manner, signals can be detected precisely and exactly. Moreover, different signals can be detected simultaneously, depending on the particular sensors and/or signal generators employed.

The manufacture of the above-mentioned sealing system does not require any costly assembly steps for mechanical construction and results in a cost-effective detection and processing of the signals.

DETAILED DESCRIPTION

Figure 1:
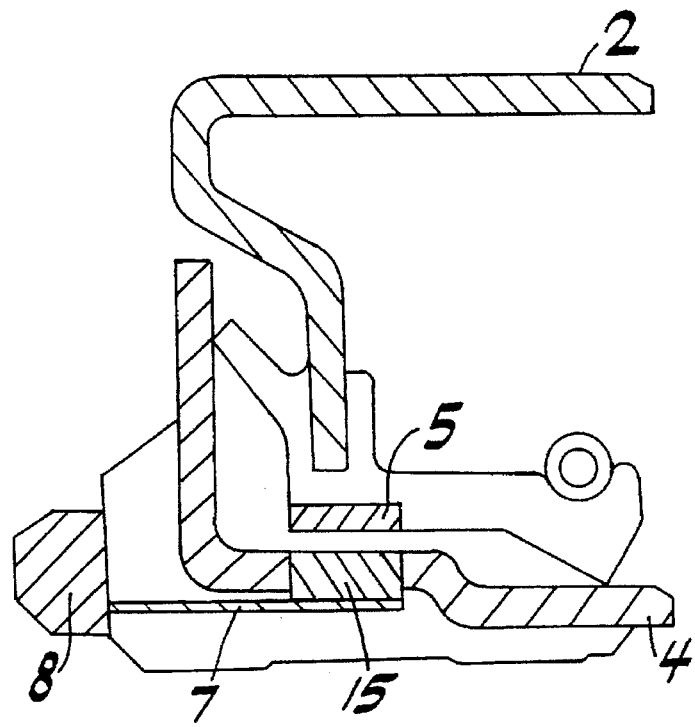
FIG. 1 is a sectional view of a seal unit having a sensor and pulse generator.
Figure 2:
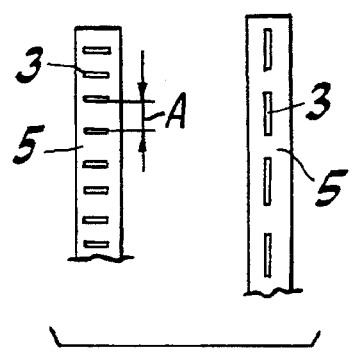
FIG. 2 is a sectional view of a portion of a seal that includes a pulse generator provided as a flexible printed-circuit board.
Figure 3:
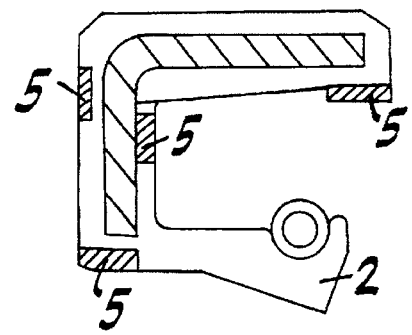
FIG. 3 is a sectional view of a sealing ring member having pulse generators.

FIG. 1 depicts a functional sealing unit equipped with both a sensor and a pulse generator as auxiliary elements. The seal comprises a material member 2 (generally in the form of an outer ring) made of an elastomeric material. Furthermore, the seal comprises a machine part 4 (this is typically in the form of an inner ring). Immovably affixed to the material member 2 along at least one section is a flexible auxiliary element 5 which performs at least one electrical function. In this embodiment, the auxiliary element 5 is a pulse generator based on a flexible printed-circuit board design. FIG. 2 shows the structure of one embodiment of a printed-circuit board designed to act as a pulse generator 5. Coding elements 9 are arranged on the carrier material of this printed-circuit board for generating pulses. As shown in the figure, the coding elements 9 are arranged on the printed-circuit board in the longitudinal or transverse direction, in accordance with their position on the material member 2 (FIG. 3), and are spaced apart from one another with a clearance "A".

The codes 9 are preferably made of iron or copper, the iron form being magnetizable. The use of flexible printed-circuit boards as pulse generators makes it possible for the pulse generator to conform very precisely to the shape of the material member 2. Furthermore, the material of the printed-circuit board allows the polymer material 2 that forms the sealing lip to be prevulcanized or adhered onto the circuit board without any additional expenditure for assembly. Due to its small dimensions, the pulse generator can be accommodated in the seal at any desired point. Because the pulse generator is applied directly to the material member 2, errors in detecting signals, such as those which occur due to the spatial separation of the two parts, can be avoided. The preferably rectangular shape of the printed-circuit board reinforces this effect.

In the embodiment shown in FIG. 1, in addition to the first auxiliary element, i.e., pulse generator 5, a sensor 15 is installed as a second auxiliary element in the seal. This sensor 15 is located on the relatively movable machine part 4 inside the seal. The sensor 15 is connected by a line 7 to a plug-in connection 8. The plug-in connection 8 is situated on the outer surface of the seal and serves as an interface between the sensor 15 and any auxiliary measuring instruments such as may be used for further processing of the signals. The line 7 preferably is itself a flexible conductors such as a flexible printed-circuit board, which is used for routing the signals and/or for supplying the sensor 15 with voltage. In this manner, the sensor 15 and the plug-in connection 8 can be conductively interconnected without having to use any additional connecting elements.

The sensor 15 preferably is arranged directly opposite (FIG. 1) the pulse generator 5, so as to minimize detection errors. Accommodating the sensor and the pulse generator in the seal prevents dirt or water from being deposited on these signal-detecting instruments, thus eliminating an additional source of errors.

This approach can also be employed to measure other parameters, such as pressure. For this purpose, the auxiliary element 5 takes the form of a piezoelectric element. Another possible application lies in detecting temperature using a thermoelement as an auxiliary element 5.

Figure 4:
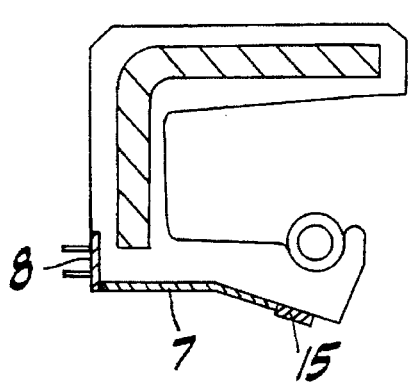
FIGS. 4 and 5 are sectional views which depict embodiments of a ring member having a sensor.
Figure 5:
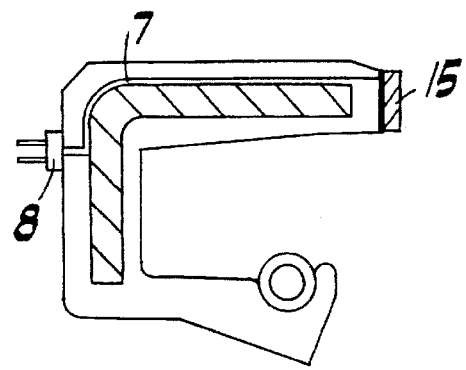

FIGS. 4 and 5 illustrate further embodiments in which the sensor is mounted on the material member 2 in connection with the line 7 and the plug-in connection 8. Thus, moisture due to leakage can be detected. The sensor can be designed as a Hall-effect sensor and also as an electric resistance/capacitance circuit.

Figure 6:
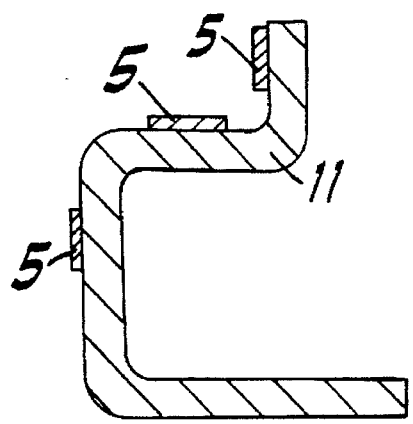
FIG. 6 depicts a series element having a pulse generator.

FIG. 6 illustrates a further embodiment in which a series of pulse generators is integrated onto a plastic or metal grease slinger 11. These elements can be used as series elements for seals.

Depending upon the specific embodiment employed, the seal that is realized by integrating a sensor and/or pulse generator as auxiliary elements onto a seal can detect and route various signals, such as those representative of temperature, moisture, rotational frequency or the pressure within a sealed space. The miniaturized construction provides both simple pulse generation, as well as a cost-effective and simple means of manufacturing the signal-detecting instruments within the seal.

What is claimed is:

1. A seal comprising:

a sealing member made of a polymer;

a first, flexible auxiliary element that is immovably affixed to the sealing member, said auxiliary element being selected from the group consisting of a pulse generator and a sensor;

a machine part that is moveable relative to the sealing member;

a second auxiliary element that is immovably affixed to the machine part, said second auxiliary element being selected from the group consisting of a pulse generator and a sensor, and wherein the second auxiliary element is a pulse generator when the first auxiliary element is a sensor and wherein the second auxiliary element is a sensor when the first auxiliary element is a pulse generator;

wherein the first auxiliary element moves with respect to the second auxiliary element whenever the sealing member moves with respect to the machine part.

2. The seal according to claim 1, wherein the first auxiliary element is embedded in the sealing member.

3. The seal according to claim 1, wherein the first auxiliary element is bonded to the surface of the sealing member.

4. The seal according to claim 1, wherein one of the first and the second auxiliary elements has a ring shape.

5. The seal according to claim 2, wherein one of the first and the second auxiliary elements has a ring shape.

6. The seal according to claim 3, wherein one of the first and the second auxiliary elements has a ring shape.

7. The seal according to claim 1, further comprising a flexible conductor that is electrically connected to at least one of the auxiliary elements so as to provide a means for providing an external electrical connection thereto.

8. The seal according to claim 1, wherein at least one of the auxiliary elements is piezoelectric.

9. The seal according to claim 5, wherein at least one of the auxiliary elements is piezoelectric.

10. The seal according to claim 1, wherein at least one of the auxiliary elements contains a capacitor and a resistor.

11. The seal according to claim 1, wherein at least one of the auxiliary elements comprises a thermoelement.

12. The seal according to claim 1, wherein the relatively movable machine part and the sealing element are packaged together in the form of a cassette.

13. The seal according to claim 12, wherein the second auxiliary element is configured to be located adjacent the first auxiliary element.

14. A seal comprising:
a first inner sealing ring;
a second outer sealing ring made of polymer, at least one of said first and second sealing rings being rotatable with respect to the other sealing ring;
at least one flexible sensor attached to one of the sealing rings; and
at least one flexible signal generator attached to the other of the sealing rings.

15. A seal as set forth in claim 14, wherein the sensor is bonded to the surface of a sealing ring.

16. A seal as set forth in claim 14, wherein the signal generator is bonded to the surface of a sealing ring.

17. A seal as set forth in claim 14, wherein the signal generator is embedded in the surface of a sealing ring.

18. A seal as set forth in claim 14, wherein the signal generator is embedded in the surface of a sealing ring.

19. A seal according to claim 14, wherein the sensor comprises a piezoelectric material.

20. A seal according to claim 14, further comprising a capacitor and resistor circuit to detect the presence of moisture.

21. A seal according to claim 14, wherein the sensor comprises a thermoelement.

22. A seal according to claim 14, wherein the sealing rings, sensor, and signal generator are combined together in a cassette-like cartridge.

23. A seal according to claim 14, wherein the sensor is in facing relation to the signal generator across a gap.

24. A seal comprising:
a first inner sealing ring;
a second outer sealing ring made of polymer that is rotatable with respect to the first inner sealing ring; and
at least one flexible sensor attached to one of the sealing rings.

* * * * *